United States Patent
Spier et al.

[11] Patent Number: 6,106,206
[45] Date of Patent: Aug. 22, 2000

[54] LASHING DEVICE INTEGRATED IN TRUCK SUPERSTRUCTURE WALLS

[75] Inventors: Willi Spier, Steinheim; Herbert Hagedorn, Horn-Bad Meinberg, both of Germany

[73] Assignee: Spier GmbH & Co., Fahrzeugwerk KG, Steinheim, Germany

[21] Appl. No.: 09/214,711

[22] PCT Filed: Jul. 11, 1996

[86] PCT No.: PCT/EP96/03030

§ 371 Date: Jan. 11, 1999

§ 102(e) Date: Jan. 11, 1999

[87] PCT Pub. No.: WO98/02332

PCT Pub. Date: Jan. 22, 1998

[51] Int. Cl.[7] .................................................. B60P 7/08
[52] U.S. Cl. ........................ 410/152; 410/144; 410/102; 410/106; 410/112
[58] Field of Search ................................ 410/152, 143, 410/144, 150, 145, 101, 102, 106, 109, 110, 112–114, 116, 149; 24/265 CD, 115 K; 248/499

[56] References Cited

U.S. PATENT DOCUMENTS

| | | | |
|---|---|---|---|
| 2,661,704 | 12/1953 | Johnson | 410/112 |
| 3,125,036 | 3/1964 | Reynolds | 410/114 |
| 3,179,068 | 4/1965 | Jensen | 410/114 |
| 3,799,070 | 3/1974 | Munson | 410/149 |
| 3,836,174 | 9/1974 | Holman, Jr. | 410/149 |
| 3,842,755 | 10/1974 | Carr | 410/113 |
| 3,996,861 | 12/1976 | Santho | 410/113 X |
| 4,169,415 | 10/1979 | Winsor | 410/114 |
| 4,332,515 | 6/1982 | Twyman | 410/149 |
| 5,104,269 | 4/1992 | Hardison | 410/149 |
| 5,752,791 | 5/1998 | Ehrlich | 410/101 |
| 5,823,724 | 10/1998 | Lee | 410/104 |
| 5,934,849 | 8/1999 | Haine | 410/113 |

FOREIGN PATENT DOCUMENTS

| | | |
|---|---|---|
| 0 258 193 | 3/1988 | European Pat. Off. . |
| 7126630 | 12/1971 | Germany . |
| 7137264 | 1/1972 | Germany . |
| 2 227 132 | 12/1973 | Germany . |
| 26 37 499 | 2/1978 | Germany . |
| 92 06 036 | 8/1992 | Germany . |
| 43 39 768 | 5/1995 | Germany . |

*Primary Examiner*—Stephen T. Gordon
*Attorney, Agent, or Firm*—Browdy and Neimark, P.L.L.C.

[57] ABSTRACT

A lashing device integrated in truck superstructure walls, in particular plywood panels, has a plurality of lashing cups (2) arranged next to each other in horizontal rows. Each lashing cup (2) has a truncated cone shape which tapers towards the cup bottom (2a), can be form-fitted into corresponding recesses of the superstructure walls and fixed therein with an adhesive. Each lashing cup (2) has a strip (5) located inside and at the center of the lashing cup (2), and an outer flange (8) that extends parallel to the cup bottom (2a) around the open cup side. The strip (5) in each lashing cup (2) matches an end coupling piece (9) of a locking bar that can be inserted between two opposite lashing cups (5).

19 Claims, 3 Drawing Sheets

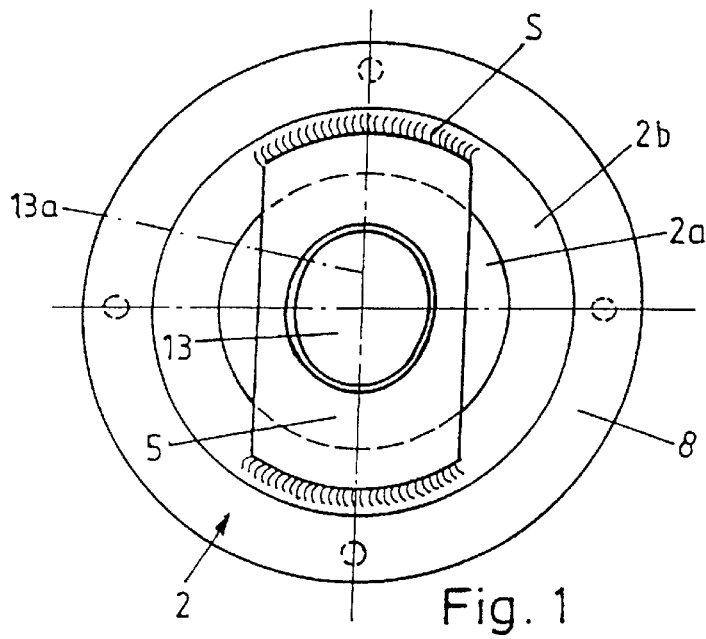
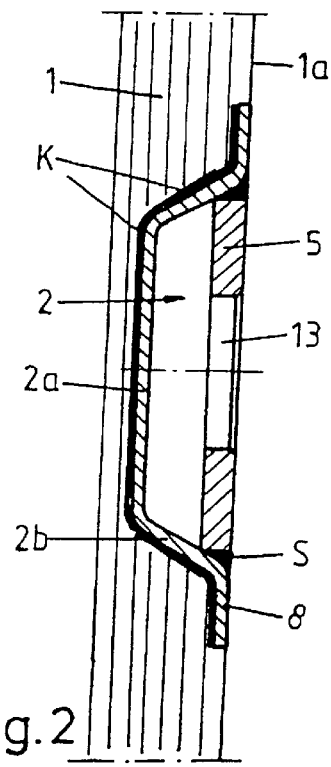
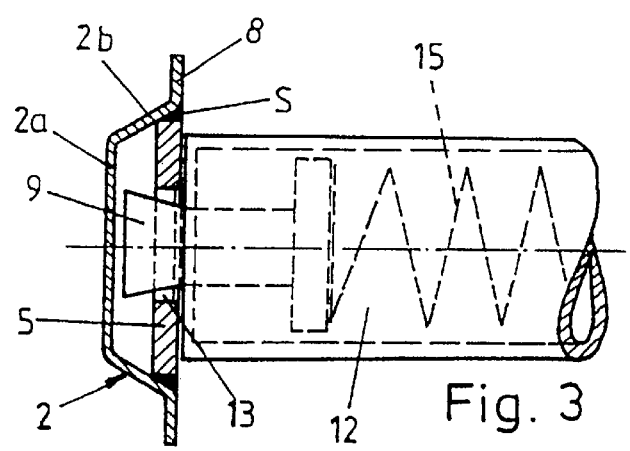

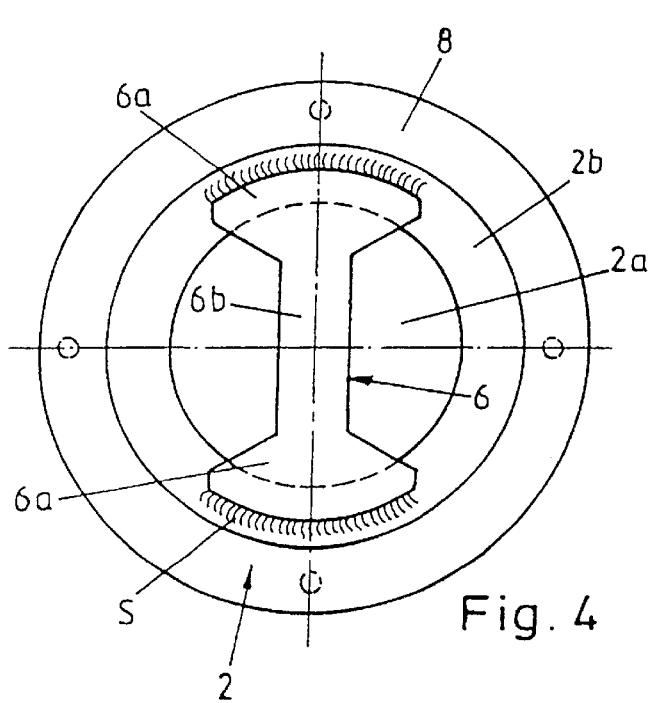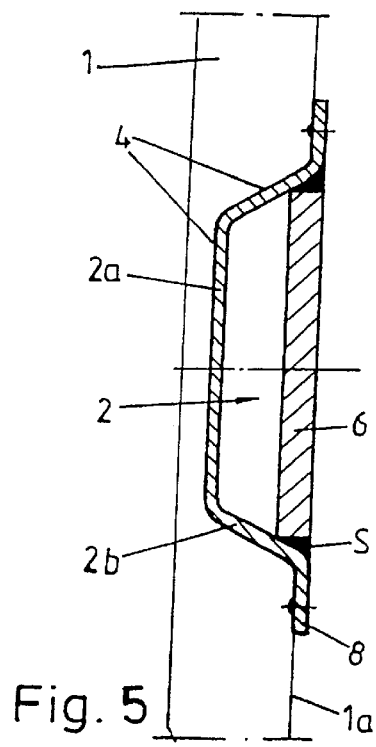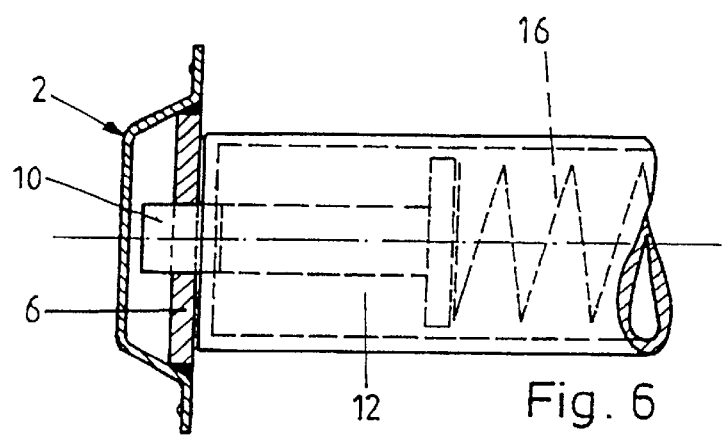

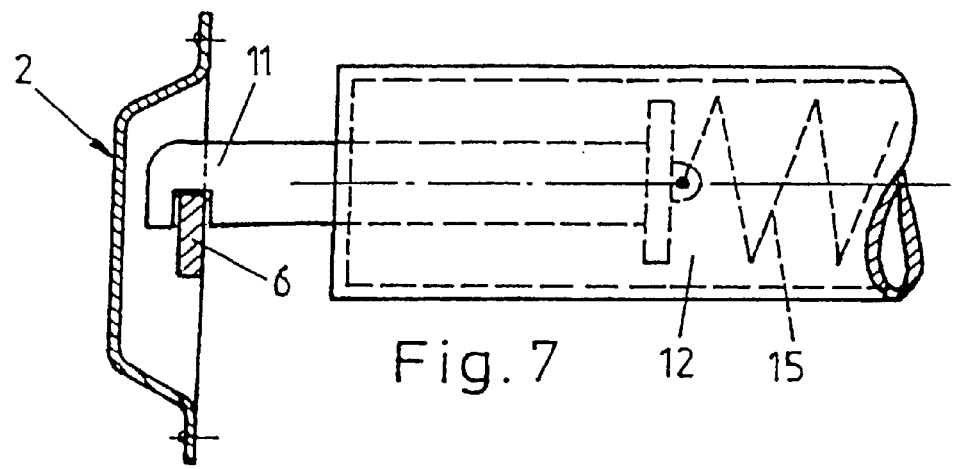
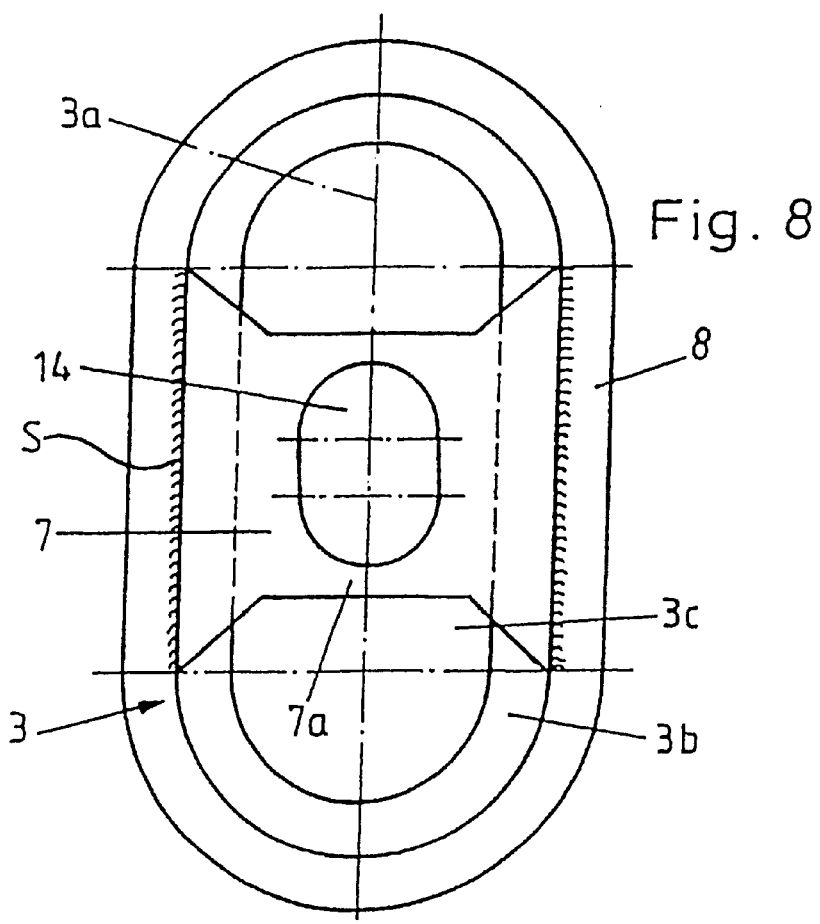

LASHING DEVICE INTEGRATED IN TRUCK SUPERSTRUCTURE WALLS

The invention relates to a lashing device that is integrated into truck superstructure walls.

A lashing device of this type comprising numerous (lashing troughs) lashing cups is known from DE 43 39 768 C2.

Based on this prior art, it is the object of the invention to further develop the lashing trough and embody it, in a simple manner, for the use of both lashing belts and locking bars.

The lashing troughs or lashing cups in accordance with the invention are embodied as circles, ovals or oblong holes, and are provided with strips that lie in the cup and extend in the center on the open cup side, and are embodied to complement an end-side coupling part of a locking bar that can be inserted between two oppositely-located lashing cups.

Because of the strip embodiment, these lashing cups can be used as combination troughs for both lashing belts and locking bars.

The frustoconical embodiment of the lashing cups of the invention meets the corresponding prerequisites for one-handed, simple threading of the lashing belts. Because the side walls of the cup are at an angle from the cup bottom, the belt end does not impact the cup wall during threading, but automatically slides through the beveling and out on the other side. At the same time, fraying of the belt end is prevented, extending the belt service life.

The strips are embodied as wide strips having a non-round hole, into which a frustoconical pin can be inserted as a coupling part of the locking bar; this coupling part is under the prestress of a tension spring, so the coupling pin is held behind the hole and the locking bar holds the opposite lashing cups together to prevent bulging of the superstructure walls.

This non-round hole further permits an easier insertion of the locking-bar coupling parts, because a certain mobility is provided in the height direction.

In a further embodiment, the strips of the lashing cup are configured as double-T legs, around whose center, narrower leg a coupling fork of the locking bar extends, the fork being under compressive tension, so the two spring-loaded coupling forks hold the locking bar securely between the two opposite lashing cups.

In a third embodiment, the locking-bar coupling part can be formed by a hook that can extend around the edge region of the strip, or around the edge region between the strip edge and the hole edge. This hook-shaped coupling part is also under the effect of a tension spring, and holds the superstructure walls securely together against bulging.

In a further embodiment, the lashing cup has an oblong-hole or oval shape and has a wide strip that extends transversely to the longitudinal direction, and into which an oblong hole extending in the longitudinal direction of the oblong shape has been cut for a locking-bar coupling part.

The strip can also be relatively wide, lending the lashing cup increased stability.

Because of its frustoconical shape, the lashing cup can be produced simply and at low cost from metal in a deep-drawing process, and the different strips are secured in this lashing cup through welding.

The frustoconical shape of the lashing cup also provides it with a larger connecting surface and a glued connection between the cup and wall, so the fastening of the lashing cup in the superstructure wall is stable, even under loads.

The invention is described in detail below by way of embodiments illustrated in the drawings. Shown are in:

FIG. 1 a front view of a lashing cup having a circular shape, with a wide strip and an oval-shaped insertion hole;

FIG. 2 a cross-section through the same lashing cup, which is inserted into a superstructure wall;

FIG. 3 a cross-section through the same lashing cup, with an inserted locking bar that engages a coupling pin in the strip insertion hole;

FIG. 4 a front view of a lashing cup having a circular shape and a double-T strip;

FIG. 5 a cross-section through the same lashing cup;

FIG. 6 a cross-section through the same lashing cup, with an inserted locking bar that extends around the strip with a coupling fork;

FIG. 7 a cross-section through the lashing cup with an inserted locking bar that extends around the strip with a coupling hook; and FIG. 8 a front view of an oblong-hole-shaped lashing cup having a wide strip and an oblong insertion hole.

The lashing device integrated into superstructure walls (1) of trucks, particularly in plywood panels, has a plurality of lashing cups (2/3) or lashing troughs disposed adjacently with spacing in horizontal rows.

Each lashing cup (2, 3) has a frustoconical cup shape that tapers toward the cup bottom (2a, 3c), and is inserted from the superstructure inside into corresponding recesses (4) of the superstructure wall (4) with a form-fit and at least close to the wall surface (1a), and is secured with an adhesive (K).

A strip (5/6/7) extends in the center inside the lashing cup (2/3), and an outer flange (8) that extends parallel to the cup bottom (2a, 3c) is formed onto the open cup side.

The strip (5/6/7) is embodied to complement an end-side coupling part (9/10/11) of a locking bar (12) that can be inserted between two opposite lashing cups (2/3).

In the embodiment according to FIGS. 1 through 3, the strip (5) is embodied as a flat wide strip (5) that occupies at least half of the diameter of the open cup side of the lashing cup (2); this wide strip (5) has in its center a non-round insertion hole (13) for the coupling part (9) of the locking bar (12), which part is embodied as a pin.

In the cup (2), the two rounded strip ends of the wide strip (5) are welded with a weld line (S) to the cup jacket (2b). For example, the open cup side of the lashing cup (2) has a diameter of about 58 mm, and the wide strip (5) is about 30 mm wide.

The insertion hole (13) is embodied as an oblong hole, preferably an elliptical or oval-shaped hole, and its larger, oblong-hole axis (13a) extends in the longitudinal direction of the strip of the lashing cup (2) whose strip (5) is disposed vertically in the superstructure wall (1). A frustoconical coupling pin (9), which, as a coupling part (9), has a widened diameter toward the free end face, is inserted into the insertion hole (13), where it can move and is anchored behind the narrower insertion region, as shown in FIG. 3.

For insertion of the coupling pin (9), the largest width of the insertion hole (13) is slightly larger than the largest diameter of the pin (9), and the narrower region of the insertion pin (13) is narrower than the pin's diameter for securing the coupling pin (9) in the back.

In the further embodiment according to FIGS. 4 through 6, the strip (6) is formed by a flat double-T strip, which is secured by its two T-legs (6a) in the cup jacket (2b), and whose narrow T-strip (6b) lies in the vertical direction of the lashing cup (2) inserted into the superstructure wall (1); a coupling fork (10), as a coupling part (10) of the inserted locking bar (12), extends around this double-T strip (6).

The lashing cup (3) according to FIG. 8 has an oblong-hole shape, and is provided with a wide strip (7) that extends transversely to the longitudinal axis (3a) of the oblong hole, and has an oblong-hole-shaped insertion hole (14) that extends in the longitudinal direction (3a) of the oblong-hole shape. This wide strip (7) has an approximate double-T shape; its two widened strip ends (7a) are welded (S) to the longitudinal sides of the cup jacket (3b).

The cup jacket (3b) extends downward in conical fashion toward the cup bottom (3c).

In accordance with FIG. 7, the coupling part (11) of the locking bar (12) can also be formed by a coupling hook (11) that extends around the strip (6) or the edge region (7a) of the strip insertion hole.

The pin- or hook-shaped coupling part (9, 11) is under the effect of a tension spring (15), and the fork-shaped coupling part (10) is under the effect of a compression spring (16) of the locking bar (12).

The tension spring (15) draws the conical coupling pin (9) toward the edge of the narrower insertion-hole region, so the opposite lashing cups (2) are held together under tension by the locking bar (12) and the superstructure walls (1) do not bulge outward.

The same is true for the coupling hook (11), which likewise holds the two lashing cups (2) together under tension by extending around the strip (6).

The compression spring (16) presses the coupling fork (10) against the strip (6), by means of which the locking bar (12) is held between the two lashing cups (2).

Because of the oblong-hole shape or oval shape of the lashing cup (3), a very wide strip (7) can be used, and a larger oblong hole (14) can therefore also be provided for the coupling parts (9, 10, 11) of the locking bar (12).

The lower edges of the strips (5/6/7) of the lashing cups (2, 3), the edges pointing toward the cup bottom (2a, 3a), are preferably rounded for simple insertion and removal of the lashing belts.

What is claimed is:

1. A lashing device to be integrated into truck superstructure walls and used with a locking bar (12) including a coupling part (9) comprising a coupling pin; the lashing device comprising:
    a plurality of lashing cups that are disposed adjacently with spacing in horizontal rows;
    wherein each lashing cup includes a frustoconical cup shape that tapers toward a lashing cup bottom and is insertable, with a form-fit, into corresponding recesses of the superstructure and is able to be glued with an adhesive, and
    wherein each lashing cup includes a strip that extends in the center in the lashing cup and an outer flange that extends parallel to the cup bottom on an open cup side;
    wherein the strip (5/6/7) complements an end-side coupling part (9/10/11) of the locking bar (12) that is insertable between two opposite ones of the lashing cups (5/6/7); and
    wherein the strip (5) is flat and wide and occupies at least half of a diameter of the open cup side of the lashing cup (2), the wide strip including in a center thereof a non-round insertion hole (13) for the coupling part (9) of the locking bar (12).

2. The lashing device according to claim 1, wherein
    the insertion hole (13) is oblong and a larger hole axis (13a) thereof extends in a longitudinal direction of the strip, the strip being disposable vertically in the superstructure wall (1), and
    wherein the coupling pin is frustoconical and includes a widened diameter toward a free end face, and is movably insertable into the insertion hole (13), wherein it is anchored behind a narrower insertion region.

3. The lashing device according to claim 9, wherein the insertion hole is elliptical or oval-shaped.

4. The lashing device according to claim 1,
    wherein the strip (6) comprises a flat double-T further including two T-legs (6a), secured in the cup jacket (2b), and a narrow T-strip (6b) lying in a vertical direction of the lashing cup (2) insertable into the superstructure wall (1), and
    wherein the coupling part (10) comprises a coupling fork of the insertable locking bar (12) which is extendable around the double-T strip (6).

5. The lashing device according to claim 1, wherein the lashing cup (3) is oblong, wherein the strip (7) extends transversely to a longitudinal direction (3a) of the lashing cup, and wherein the insertion hole is oblong-shaped (14) and extends in the longitudinal direction (3a) of the lashing cup.

6. The lashing device according to claim 1, wherein the coupling part (11) of the locking bar (12) comprises a coupling hook (11) that is extendable around the strip (6) or an edge region (7a) of the insertion hole.

7. The lashing device according to claim 1, wherein the coupling part is under the effect of a spring of the locking bar (12).

8. The lashing device according to claim 7, wherein the coupling part (9, 11) is pin-or-hook-shaped and the spring is a tension spring (15).

9. The lashing device according to claim 7, wherein the coupling part (10) is fork-shaped and the spring is a compression spring (16).

10. The lashing device according to claim 1, wherein the truck superstructure walls comprise plywood panels.

11. A lashing device to be integrated into truck superstructure walls and used with a locking bar (12) including a coupling part (9) comprising a coupling pin; the lashing device comprising:
    a plurality of lashing cups that are disposed adjacently with spacing in horizontal rows;
    wherein each lashing cup includes a frustoconical cup shape that tapers toward a lashing cup bottom and is insertable, with a form-fit, into corresponding recesses of the superstructure and is able to be glued with an adhesive, and
    wherein each lashing cup includes a strip that extends in the center in the lashing cup and an outer flange that extends parallel to the cup bottom on an open cup side;
    wherein the strip (5/6/7) complements an end-side coupling part (9/10/11) of the locking bar (12) that is insertable between two opposite ones of the lashing cups (5/6/7); and
    wherein the lashing cup (3) is oblong, wherein the strip (7) extends transversely to a longitudinal direction (3a) of the lashing cup, the strip including an insertion hole, wherein the insertion hole is oblong-shaped (14) and extends in the longitudinal direction (3a) of the lashing cup.

12. The lashing device according to claim 11, wherein
    the insertion hole (13) is oblong and a larger hole axis (13a) thereof extends in a longitudinal direction of the strip, the strip being disposable vertically in the superstructure wall (1), and
    wherein the coupling pin is frustoconical and includes a widened diameter toward a free end face, and is movably insertable into the insertion hole (13), wherein it is anchored behind a narrower insertion region.

13. The lashing device according to claim 12, wherein the insertion hole is elliptical or oval-shaped.

14. The lashing device according to claim 11, wherein the strip (6) comprises a flat double-T further including two T-legs (6*a*), secured in the cup jacket (2*b*), and a narrow T-strip (6*b*) lying in a vertical direction of the lashing cup (2) insertable into the superstructure wall (1), and wherein the coupling part (10) comprises a coupling fork of the insertable locking bar (12) which is extendable around the double-T strip (6).

15. The lashing device according to claim 11, wherein the coupling part (11) of the locking bar (12) comprises a coupling hook (11) that extendable around the strip (6) or an edge region (7*a*) of the insertion hole.

16. The lashing device according to claim 11, wherein the coupling part is under the effect of a spring of the locking bar (12).

17. The lashing device according to claim 16, wherein the coupling part (9, 11) is pin-or-hook-shaped and the spring is a tension spring (15).

18. The lashing device according to claim 16, wherein the coupling part (10) is fork-shaped and the spring is a compression spring (16).

19. The lashing device according to claim 11, wherein the truck superstructure walls comprise plywood panels.

\* \* \* \* \*